United States Patent
Singh et al.

(10) Patent No.: US 12,174,617 B1
(45) Date of Patent: Dec. 24, 2024

(54) RESIDUAL LIMIT DETERMINATION FOR A CLEANING AGENT CORRESPONDING TO A VALIDATION OF AN EQUIPMENT CLEANING PROCESS

(71) Applicant: ValGenesis, Inc., Santa Clara, CA (US)

(72) Inventors: Sumel Singh, Waterloo (CA); Sivakumar Muthusamy, Fremont, CA (US)

(73) Assignee: VALGENESIS, INC., Santa Clara, CA (US)

( * ) Notice: Subject to any disclaimer, the term of this patent is extended or adjusted under 35 U.S.C. 154(b) by 0 days.

(21) Appl. No.: 18/790,196

(22) Filed: Jul. 31, 2024

Related U.S. Application Data

(60) Provisional application No. 63/516,826, filed on Jul. 31, 2023.

(51) Int. Cl.
| | |
|---|---|
| G05B 19/04 | (2006.01) |
| G05B 19/4155 | (2006.01) |
| G05B 23/02 | (2006.01) |

(52) U.S. Cl.
CPC ......... *G05B 19/4155* (2013.01); *G05B 19/04* (2013.01); *G05B 23/02* (2013.01); *G05B 2219/35109* (2013.01); *G06F 2201/81* (2013.01)

(58) Field of Classification Search
CPC .... G05B 19/4155; G05B 19/04; G05B 23/02; G05B 2219/35109; G06F 2201/81
See application file for complete search history.

(56) References Cited

U.S. PATENT DOCUMENTS

| | | |
|---|---|---|
| 9,720,687 B2 | 8/2017 | Muthusamy |
| 2006/0117654 A1* | 6/2006 | Canhoto .................. B08B 3/04 |
| | | 47/58.1 SC |
| 2007/0143032 A1* | 6/2007 | Wieringa ............... G01N 31/22 |
| | | 702/24 |

(Continued)

OTHER PUBLICATIONS

Singh, S. "A Review on Cleaning Validation of Equipment", Feb. 2022, Internation Journal of Research Publication and Review, vol. 3, No. 2, p. 4-11, (Year: 2022).*

(Continued)

*Primary Examiner* — Kenneth M Lo
*Assistant Examiner* — Jonathan Michael Skrzycki
(74) *Attorney, Agent, or Firm* — Amin, Turocy & Watson, LLP

(57) ABSTRACT

Residual limit determination for a cleaning agent corresponding to a validation of an equipment cleaning process is presented herein. A system determines a cleaning agent for cleaning a group of equipment to be used to manufacture a product; and determines a sum of surface areas of respective surfaces of respective groups of parts of the group of the equipment that have been determined to be contacted by the product and the cleaning agent. Based on the sum of surface areas of the respective surfaces that have been determined to be contacted by the product and the cleaning agent, the system determines a cleaning agent residue limit representing a threshold maximum allowable residue of the cleaning agent to be present after the cleaning process has been performed on the group of equipment, and facilitates a cleaning validation of the cleaning process according to the cleaning agent residue limit.

17 Claims, 14 Drawing Sheets

(56) References Cited

U.S. PATENT DOCUMENTS

| | | | | |
|---|---|---|---|---|
| 2007/0192715 A1* | 8/2007 | Kataria | ............... | G06Q 10/087 705/28 |
| 2010/0236582 A1 | 9/2010 | Heintz et al. | | |
| 2011/0276161 A1 | 11/2011 | Lee et al. | | |
| 2012/0189992 A1* | 7/2012 | Craig | ............... | G01N 21/94 434/219 |
| 2013/0229516 A1* | 9/2013 | Jones | ............... | G01N 21/35 348/143 |
| 2023/0273126 A1* | 8/2023 | Kouda | ............... | G01N 30/02 356/445 |

OTHER PUBLICATIONS

Gronberg, A. "Cleaning-in-Place and Sanitation", 2018, Biopharmaceutical Processing, Ch. 33, p. 675-699, URL:<https://www.researchgate.net/publication/323623199_Cleaning-in-Place_and_Sanitization> (Year: 2018).*

Katz, "Cleaning Validation Protocol for Pharmaceutical Industry", 2024, Website URL:<https://www.gmpsop.com/cleaning-validation-protocol/> (Year: 2024).*

LeBlanc, D. "Surface Areas in Carryover Calculations", 2019, Website URL:<https://cleaningvalidation.com/memos/surfaces-areas-in-carryover-calculations/> (Year: 2019).*

Sajid, S. "Validation of cleaning of pharmaceutical manufacturing equipment, illustrated by determination of cephradine residues", 2010, Analytical Methods, vol. 2, p. 397-401, URL:<https://pubs.rsc.org/en/content/articlelanding/2010/ay/b9ay00278b> (Year: 2010).*

Murthy, D. "A Review Article on Cleaning Validation", 2013, Internation Journal of Pharmaceutical Sciences and Research, vol. 4(9), p. 3317-3327, URL:<https://ijpsr.com/bft-article/a-review-article-on-cleaning-validation/> (Year: 2013).*

Ghosh, A. "Overview of Cleaning Validation in Pharmaceutical Industry", 2010, Internation Journal of Pharmaceutical Quality Assurance, vol. 2(2), p. 26-30, URL:<https://citeseerx.ist.psu.edu/document?repid=rep1&type=pdf&doi=9b7dd90b2a17ff1e221c3283278177d1c1f22653> (Year: 2010).*

Sharma, et al. "Automating MACO Calculations in Cleaning Validation" Pharmaceutical Engineering, Mar. / Apr. 2021, 20 pages.

International Search Report and Written Opinion mailed Oct. 29, 2024 for PCT Application No. PCT/US24/40347, 16 pages.

\* cited by examiner

500 ↘

```
┌─────────────────────────────────────────────────────────────────┐
│  CLEANING AGENT RESIDUE LIMIT DETERMINATION COMPONENT 320       │
│                                                                 │
│   ┌─────────────────────────────────────────────────────────┐   │
│   │                                                         │   │
│   │     CLEANING AGENT DETERMINATION COMPONENT 510          │   │
│   │                                                         │   │
│   └─────────────────────────────────────────────────────────┘   │
│                                                                 │
│   ┌─────────────────────────────────────────────────────────┐   │
│   │                                                         │   │
│   │   SHARED SURFACE AREA DETERMINATION COMPONENT 520       │   │
│   │                                                         │   │
│   └─────────────────────────────────────────────────────────┘   │
│                                                                 │
└─────────────────────────────────────────────────────────────────┘
```

1110 in response to determining respective risk assessments representing respective degrees of difficulty in cleaning of respective portions of the respective groups of parts of the group of equipment, determine, by the system based on the respective risk assessments, that the respective portions of the respective groups of parts of the group of equipment are difficult to clean

1120 identify, by the system via respective digitized images representing two-dimensional or three-dimensional models of the group of equipment, locations of the respective portions of the respective groups of parts of the group of equipment that have been determined to be difficult to clean as respective sample locations for performance of the cleaning validation of the cleaning process according to the cleaning agent residue limit

1130 associate, by the system via a data store, the respective sample locations with the cleaning validation, in which the performance of the cleaning validation of the cleaning process determines whether an amount of the cleaning agent residue that has been determined to be present on a test sample that has been obtained at a sample location of the respective sample locations is lower than the cleaning agent residue limit

FIG. 11

RESIDUAL LIMIT DETERMINATION FOR A CLEANING AGENT CORRESPONDING TO A VALIDATION OF AN EQUIPMENT CLEANING PROCESS

RELATED APPLICATION

The subject patent application claims priority to U.S. Provisional Patent Application No. 63/516,826, filed Jul. 31, 2023, and entitled "PROCESS MANAGER: A COMPREHENSIVE CLEANING VALIDATION LIFECYCLE SYSTEM WITH UNIQUE FEATURES AND AUTOMATED DOCUMENTATION", the entirety of which priority application is hereby incorporated by reference herein.

TECHNICAL FIELD

The subject disclosure generally relates to embodiments for a residual limit determination for a cleaning agent corresponding to a validation of an equipment cleaning process.

BACKGROUND

A maximum amount of carryover (MACO) value for a cleaning agent that has been used to clean equipment-after a product, e.g., pharmaceutical drug, has been manufactured via the equipment-represents a maximum value of residue of the cleaning agent, or cleaning agent residue, which is acceptable to be left on the equipment after it has been cleaned with the cleaning agent.

Conventional product manufacturing cleaning technologies utilize a total surface area of the equipment to calculate the MACO value, which overestimates an actual surface area of the equipment that has been shared between the product and the cleaning agent, e.g., from production of the product using the equipment through cleaning of the equipment.

Such overestimation of surface area results in a calculation of an excessively stringent MACO value that subsequently represents an excessively low value of cleaning agent residue that is acceptable to remain on the equipment after it has been cleaned.

In turn, conventional product manufacturing cleaning technologies use excessive cleaning resources to meet such stringent values, e.g., using more water and electricity to rinse the equipment at higher temperatures to remove more cleaning agent residue.

Alternatively, conventional product manufacturing cleaning technologies use solvent(s), e.g., ethanol, to rinse equipment, e.g., multiple times, after it has been cleaned with a cleaning agent; or only use solvent(s) to clean the equipment-without using a cleaning agent and water. In this regard, as the solvent(s) evaporate after they have been used to clean equipment, no cleaning agent residue, e.g., solvent residue, remains on the equipment after it is cleaned.

Although use of solvent(s) as cleaning agent(s) enables conventional product manufacturing technologies to avoid calculation of cleaning agent MACO values, such use is expensive, e.g., due to high amounts of solvent(s) that are used to clean equipment (e.g., via ethanol baths), and/or due to high costs associated with disposing of large amounts of solvent(s) in an environmentally safe manner. Further, use of solvent(s) as cleaning agents by conventional product manufacturing technologies can be hazardous to the environment when such technologies avoid the high costs of their disposal.

Consequently, conventional product manufacturing technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified:

FIG. 5 illustrates a block diagram of a cleaning agent residue limit determination component of a cleaning validation system that facilitates a residual limit determination for a cleaning agent corresponding to a validation of an equipment cleaning process, in accordance with various example embodiments;

FIG. 11 illustrates a flow chart of a method associated with a cleaning validation system that identifies, as sample locations based on respective risk assessments and utilizing respective digitized images representing 2-D or 3-D models of the equipment, respective portions of respective groups of parts of the equipment that have been determined to be difficult to clean for performance of a cleaning validation, and associates, via a data store, the sample locations with the cleaning validation, in accordance with various example embodiments;

DETAILED DESCRIPTION

Figure 1:
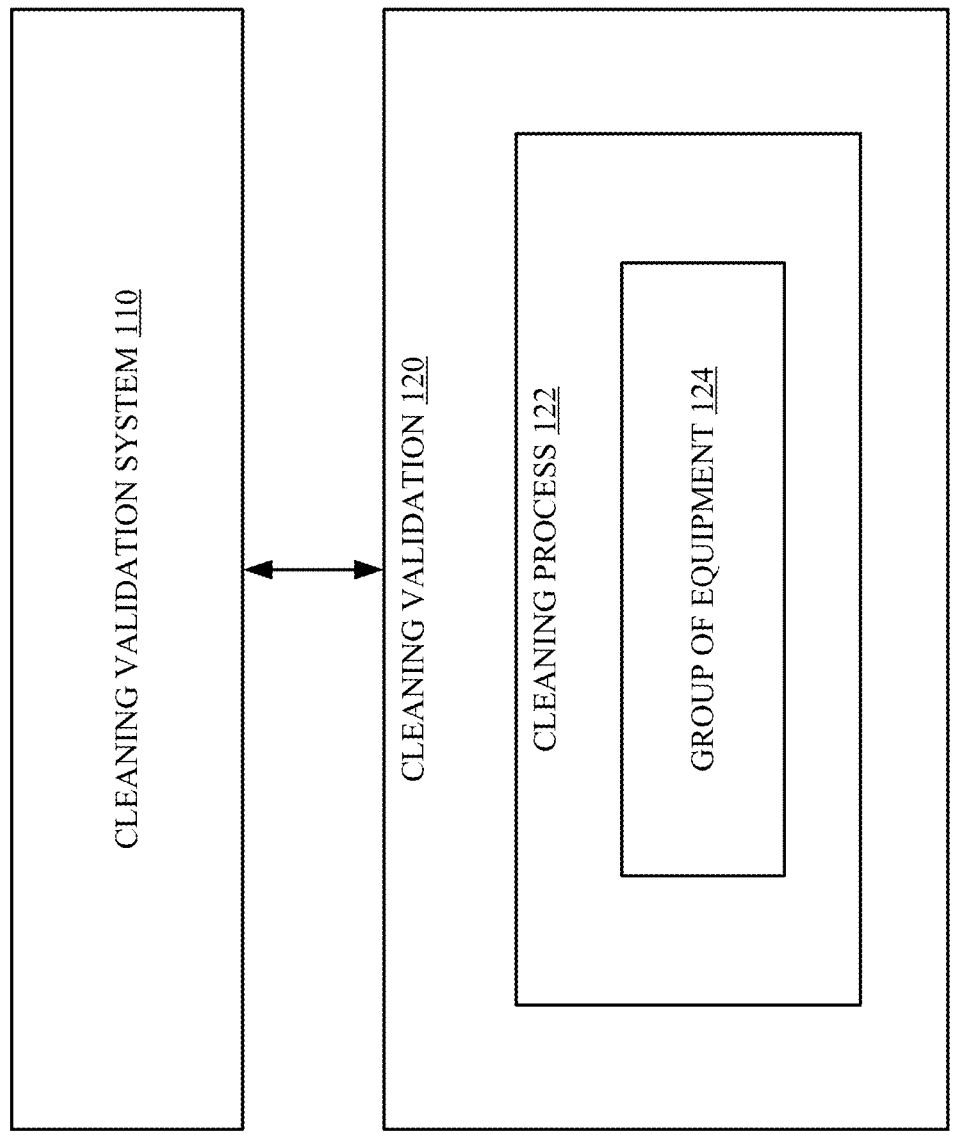
FIG. 1 illustrates a block diagram of a cleaning validation environment including a cleaning validation system that facilitates a residual limit determination for a cleaning agent corresponding to a validation of an equipment cleaning process, in accordance with various example embodiments.
Figure 2:
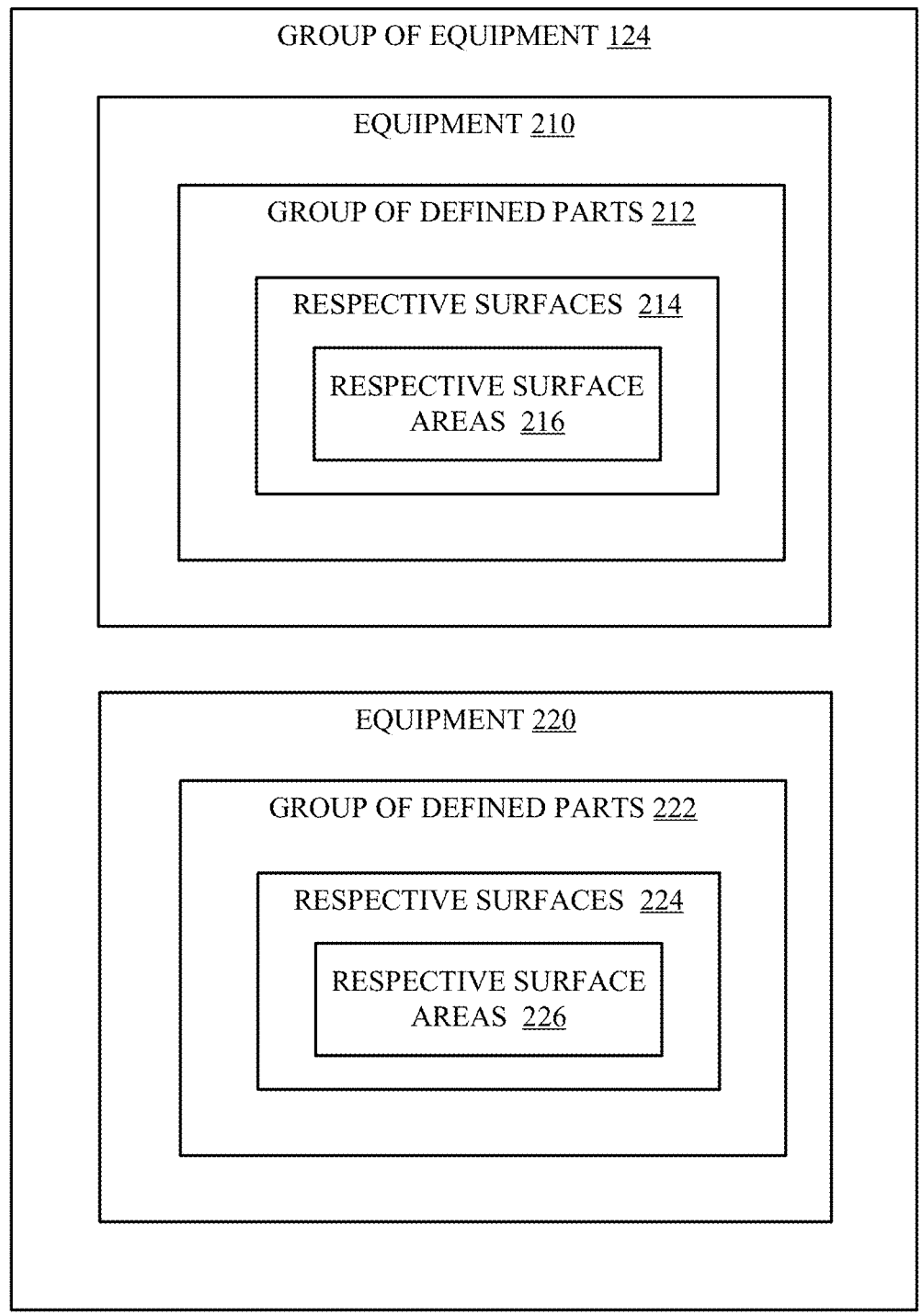
FIG. 2 illustrates a block diagram of a group of equipment that is to be used to manufacture a product, in accordance with various example embodiments.
Figure 3:
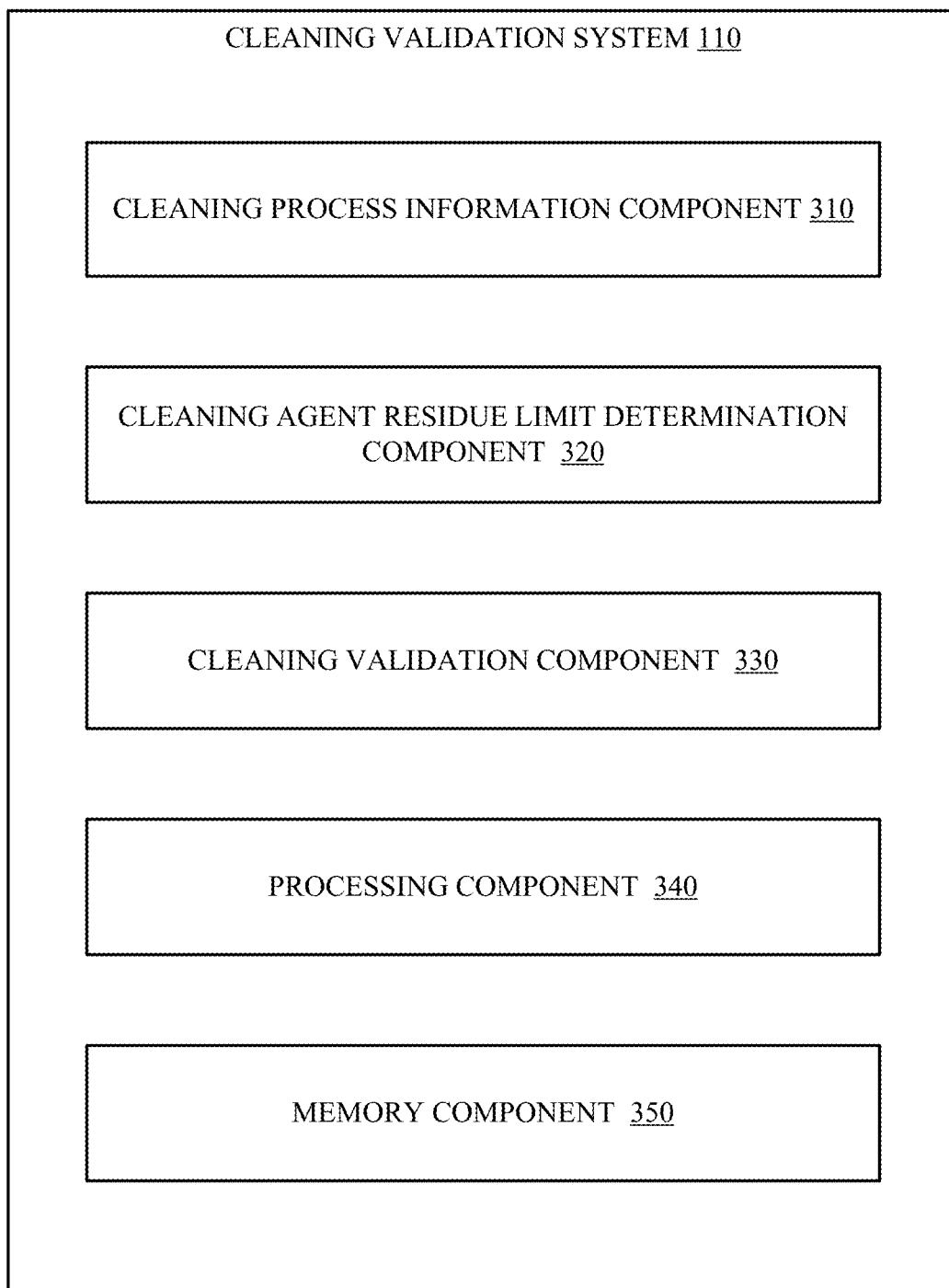
FIG. 3 illustrates a block diagram of a cleaning validation system that facilitates a residual limit determination for a cleaning agent corresponding to a validation of an equipment cleaning process, in accordance with various example embodiments.
Figure 4:
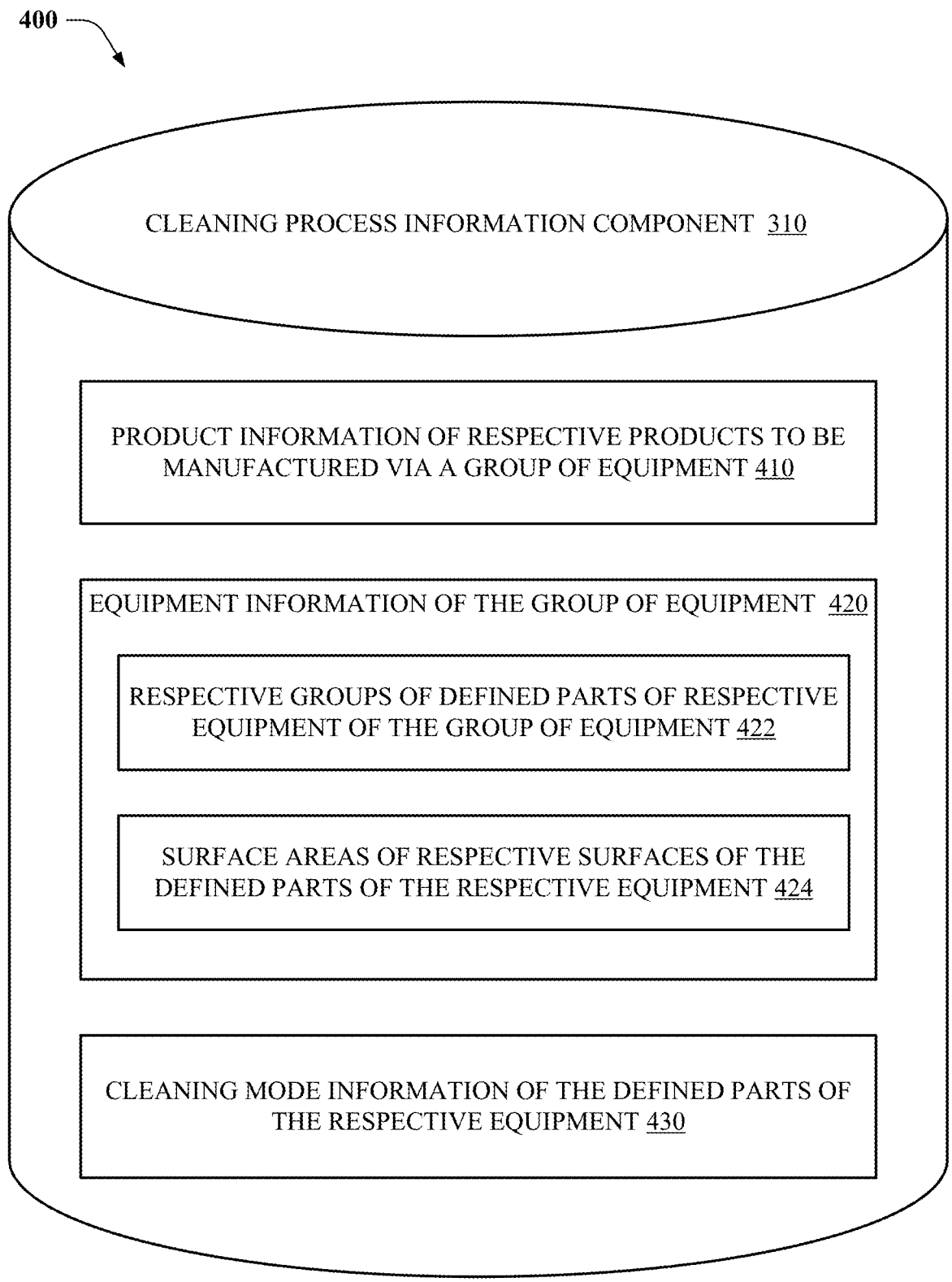
FIG. 4 illustrates a block diagram of a cleaning process information component of a cleaning validation system that facilitates a residual limit determination for a cleaning agent corresponding to a validation of an equipment cleaning process, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Conventional product manufacturing cleaning technologies have had some drawbacks such as overestimating an actual surface area of equipment to be shared between a product to be manufactured via the equipment and a cleaning agent to be used to clean the equipment, which results in a calculation of excessively stringent MACO values. Accordingly, conventional product manufacturing cleaning technologies use excessive cleaning resources to meet such stringent values, e.g., using more water and electricity than necessary to rinse the equipment at higher temperatures to remove more cleaning agent residue than would otherwise be needed to remove.

Another drawback of conventional product manufacturing cleaning technologies is their use of solvent(s), e.g., ethanol, to rinse equipment after it has been cleaned with a cleaning agent and water, or their use of solvent(s) to clean the equipment without using a cleaning agent, e.g., to avoid calculation of cleaning agent MACO values. Such use of solvent(s) is expensive, e.g., due to high amounts of solvent(s) that are used to clean equipment (e.g., via ethanol baths), and/or due to high costs associated with disposing of large amounts of solvent(s) in an environmentally safe manner. Further, use of solvent(s) as cleaning agents by conventional product manufacturing technologies can be hazardous to the environment when such technologies avoid the high costs of their disposal.

On the other hand, in various embodiments disclosed herein, a cleaning validation system can facilitate a more efficient, economical, and/or effective cleaning validation by determining, based on a sum of surface areas of a group of defined parts of an equipment that are to be shared between a product and a cleaning agent, a residual limit calculation for the cleaning agent corresponding to a performance of a cleaning validation of a cleaning process that has been performed on the equipment.

In embodiment(s), the cleaning validation system comprises: at least one processor; and at least one memory that stores executable components that, when executed by the at least one processor, facilitate performance of operations by the system, the operations comprising: determining a product to be manufactured via an equipment, a group of defined parts of the equipment, respective defined cleaning modes of the group of defined parts, and respective surface areas of respective surfaces of the group of defined parts; based on the product to be manufactured via the equipment, a type of a surface of the respective surfaces of a defined part of the group of defined parts, a surface area of the surface of the defined part, and a cleaning mode of the respective defined cleaning modes of the defined part, determining a cleaning agent to be used for cleaning, via a cleaning process, the surface of the defined part; and in response to the surface area of the surface of the defined part being determined to be contacted by the product and the cleaning agent, identifying the surface area as a shared surface area for the defined part.

In turn, the operations further comprise: determining a sum of shared surface areas of the respective surface areas of the defined parts that have been determined to be contacted by the product and the cleaning agent, in which the shared surface areas comprises the shared surface area for the defined part; and based on the sum of shared surface areas of the defined parts that have been determined to be contacted by the product and the cleaning agent, determining a cleaning agent residue limit representing a threshold allowable residue of the cleaning agent to be present after the cleaning process has been performed on the equipment, and in response to the cleaning process being performed on the equipment, performing a cleaning validation of the cleaning process according to the cleaning agent residue limit.

In other embodiment(s), a method comprises: based on a group of defined parameters corresponding to a cleaning process for cleaning a group of equipment to be used to manufacture a product, determining, by a system comprising at least one processor, a cleaning agent for the cleaning of the group of equipment; determining, by the system, a sum of surface areas of respective surfaces of respective groups of parts of the group of the equipment that have been determined to be contacted by the product and the cleaning agent; and based on the sum of surface areas of the respective surfaces of the respective groups of parts that have been determined to be contacted by the product and the cleaning agent, determining, by the system, a cleaning agent residue limit representing a threshold maximum allowable residue of the cleaning agent to be present after the cleaning process has been performed on the group of equipment, and in response to the cleaning process being performed on the group of equipment, performing, via the system, a cleaning validation of the cleaning process according to the cleaning agent residue limit.

In yet other embodiment(s), a non-transitory machine-readable medium comprises executable instructions that, when executed by a processor, facilitate performance of operations, comprising: determining a sum of surface areas of respective surfaces of respective parts of a group of equipment, in which the respective surfaces have been determined to be contacted by a product and a cleaning agent, in which the product has been determined to be manufactured via the group of equipment, and in which the cleaning agent has been determined, based on a group of defined parameters corresponding to a cleaning process for cleaning the group of equipment, to be used to clean the equipment; and based on the sum of surface areas of the respective surfaces of the respective parts of the group of equipment that have been determined to be contacted by the product and the cleaning agent, determining a cleaning agent residue limit representing a threshold allowable residue of the cleaning agent to be present after the cleaning process has been performed on the group of equipment, and in response to the cleaning process being performed on the group of equipment, performing a cleaning validation of the cleaning process according to the cleaning agent residue limit.

Now referring to FIGS. 1-4, block diagrams (100, 200, 300, 400) of a cleaning validation environment including a cleaning validation system (110) that facilitates a residual limit determination for a cleaning agent corresponding to a cleaning validation (120) of an equipment cleaning process (122) to be performed on group of equipment (124); the group of equipment; the cleaning validation system; and a cleaning process information component (310) are illustrated, respectively, in accordance with various example embodiments.

The cleaning validation system includes the cleaning process information component, a cleaning agent residue limit determination component (320), a cleaning validation component (330), a processing component (340), and a memory component (350). In embodiment(s), the memory component stores executable instructions that, when executed by the processing component, facilitate performance of operations by the cleaning validation system.

The cleaning process information component comprises and/or represents a group of defined parameters corresponding to the equipment cleaning process. In this regard, in embodiment(s), such parameters comprise product information (410) of respective products to be manufactured via the group of equipment; equipment information (420) of the group of equipment comprising respective groups (422) of defined parts (212, 222) of respective equipment (210, 220) of the group of equipment; surface areas (216, 226, 424) of respective surfaces (214, 224) of the defined parts of the respective equipment; and cleaning mode information (430) of the defined parts of the respective equipment.

In other embodiment(s), the group of defined parameters represent a product to be manufactured via an equipment; a group of defined parts of the equipment; respective defined cleaning modes of the group of defined parts; respective surface areas of respective surfaces of the group of defined parts; a type of a surface of the respective surfaces of a defined part of the group of defined parts; a surface area of the surface of the defined part; and a cleaning mode of the respective defined cleaning modes of the defined part.

Referring now to FIG. 5, the cleaning agent residue limit determination component comprises a cleaning agent determination component (510) and a shared surface area determination component (520). The cleaning agent determination component determines, via the cleaning process information component, the group of defined parameters corresponding to the equipment cleaning process. In embodiment(s), the group of defined parameters comprises a product to be manufactured via an equipment, a group of defined parts of the equipment, respective defined cleaning modes of the group of defined parts, respective surface areas of respective surfaces of the group of defined parts, and types of the respective surfaces of the group of defined parts.

In turn, based on the product to be manufactured via the equipment, a type of a surface of the respective surfaces of a defined part of the group of defined parts, a surface area of the surface of the defined part, and a cleaning mode of the respective defined cleaning modes of the defined part, the cleaning agent determination component determines a cleaning agent to be used for cleaning, via a cleaning process (122), the surface of the defined part.

In response to the surface area of the surface of the defined part being determined, via the shared surface area determination component, to be contacted by the product and the cleaning agent, the shared surface area determination component identifies the surface area as a shared surface area for the defined part. Accordingly, the cleaning agent residue limit determination component determines a sum of shared surface areas of the respective surface areas of the defined parts that have been determined, via the shared surface area determination component, to be contacted by the product and the cleaning agent, in which the shared surface areas comprises the shared surface area for the defined part.

Based on the sum of shared surface areas of the defined parts that have been determined to be contacted by the product and the cleaning agent, the cleaning agent residue limit determination component determines a cleaning agent residue limit representing a threshold allowable residue of the cleaning agent to be present after the cleaning process has been performed on the equipment.

In various embodiment(s), the sum of shared surface areas of the defined parts of the equipment is less that a total surface area of the equipment, which results in calculation of MACO values that more accurately, e.g., without overestimation, represent surface areas of equipment to be shared between a product to be manufactured via the equipment and a cleaning agent to be used to clean the equipment. Accordingly, such less stringent MACO values require less cleaning resources to be used to clean the equipment, e.g., saving cleaning validation expense and time.

Figure 6:
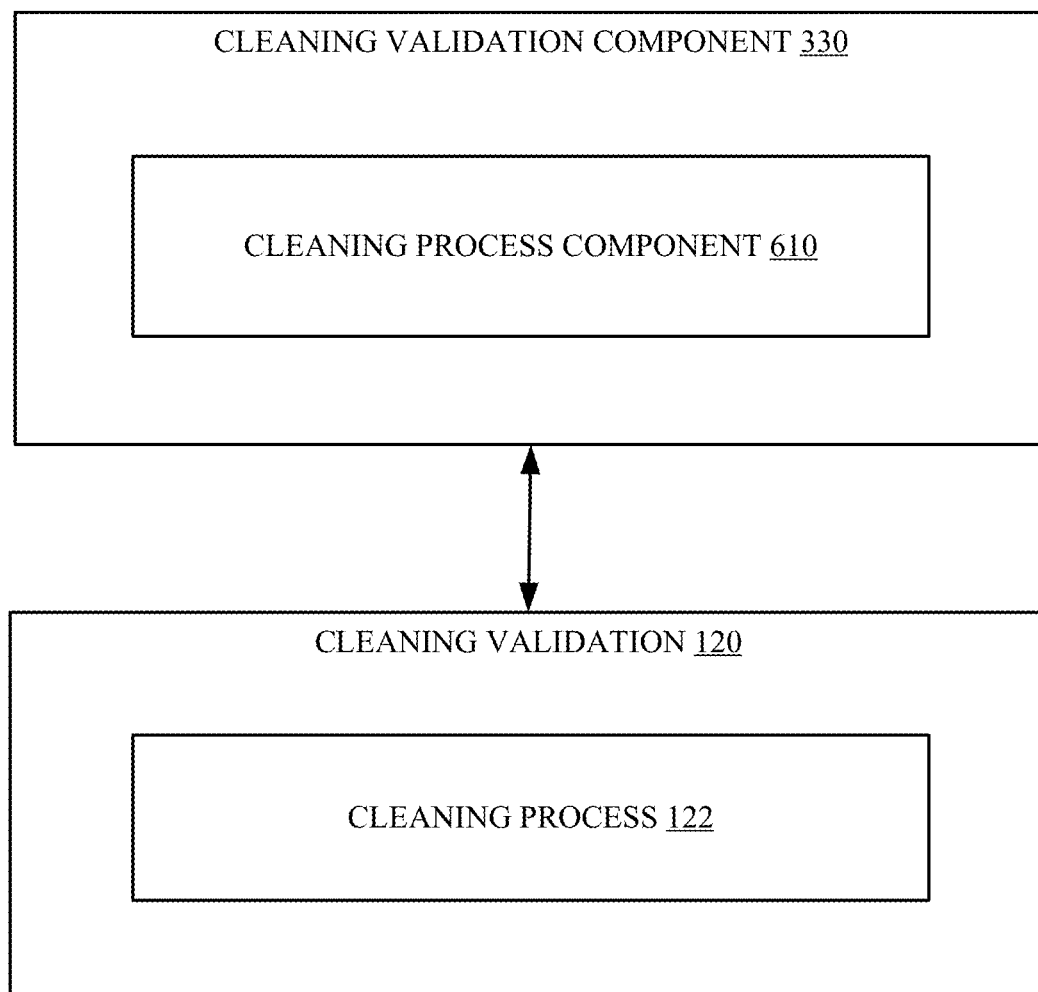
FIG. 6 illustrates a block diagram of a cleaning validation component of a cleaning validation system that facilitates a residual limit determination for a cleaning agent corresponding to a validation of an equipment cleaning process, in accordance with various example embodiments.

Referring now to FIG. 6, the cleaning validation component can determine that the cleaning process (122) has been performed on the group of equipment, e.g., based on an input that has been received via a cleaning process component (610) that monitors progress of the cleaning process, e.g., via an input (not shown) that has been received via personnel associated with, e.g., that have been monitoring, the cleaning process.

In turn, in response to a determination that the cleaning process has been performed on the group of equipment, the cleaning validation component can perform a cleaning validation (120) of the cleaning process according to the cleaning agent residue limit.

In embodiment(s), the shared surface area determination component determines a group of equipment (124) comprising the equipment to be used to manufacture the product, in which the group of equipment comprises an equipment train. Further, the shared surface area determination component determines respective surface areas of respective surfaces of the equipment train that are to be contacted by the product and the cleaning agent.

The cleaning agent residue limit determination component determines an equipment train sum of respective surface areas of respective surfaces of the equipment train that are to be contacted by the product and the cleaning agent; and based on the equipment train sum, the cleaning agent residue limit determination component determines an equipment train cleaning agent residue limit representing an equipment train threshold allowable residue of the cleaning agent to be present after the cleaning process has been performed on the equipment train.

The cleaning validation component can determine that the cleaning process (122) has been performed on the equipment train, e.g., based on an input that has been received via the cleaning process component as described above. In turn, in response to a determination that the cleaning process has been performed on the equipment train, the cleaning validation component can perform a cleaning validation of the cleaning process according to the equipment train cleaning agent residue limit.

In embodiment(s), the cleaning validation system can comprise a defined cleaning knowledge base that has been stored in a data store (not shown), e.g., included in the memory component, which represents types of surfaces of the equipment that have been determined to satisfy a defined condition representing that the equipment is difficult to clean, e.g., surfaces such as baffles, corners, non-metallic surfaces (e.g., plastic), moving parts (e.g., corresponding to a blender and/or mixing equipment).

In other embodiment(s), the cleaning validation component can generate and/or modify the defined cleaning knowledge base based on respective risk assessments representing respective degrees of difficulty in cleaning the respective portions of the group of defined parts of the equipment, and based on the respective risk assessments, the cleaning validation component can determine that the respective portions of the group of defined parts of the equipment are difficult to clean.

In yet other embodiment(s), the cleaning validation component can identify, via digitized images representing two-dimensional or three-dimensional models of the equipment, locations of the respective portions of the group of defined parts of the equipment that have been determined to be difficult to clean as respective sample locations for performance of the cleaning validation of the cleaning process according to the cleaning agent residue limit.

In turn, in embodiment(s), the cleaning validation component can associate, via a data store (not shown), e.g., included in the memory component, the respective sample locations with a cleaning validation process (e.g., cleaning validation 120) that validates, via the performance of the cleaning validation, whether an amount of the cleaning agent residue that has been determined to be present on a test sample that has been obtained at a sample location of the respective sample locations is lower than the cleaning agent residue limit.

In other embodiment(s), based on a defined sampling protocol, e.g., obtained via the data store and defined by the cleaning validation, the cleaning validation component can determine respective types of samples to perform at the respective sample locations for the performance of the cleaning validation of the cleaning process according to the cleaning agent residue limit.

Further, the cleaning validation component can obtain, via instruments physically coupled to the equipment, the respective types of samples at the respective sample locations according to the defined sampling protocol, and determine whether the respective types of samples satisfy a defined condition representing that the amount of the cleaning agent residue that has been determined to be present on the respective types of samples is lower than the cleaning agent residue limit.

Figure 7:
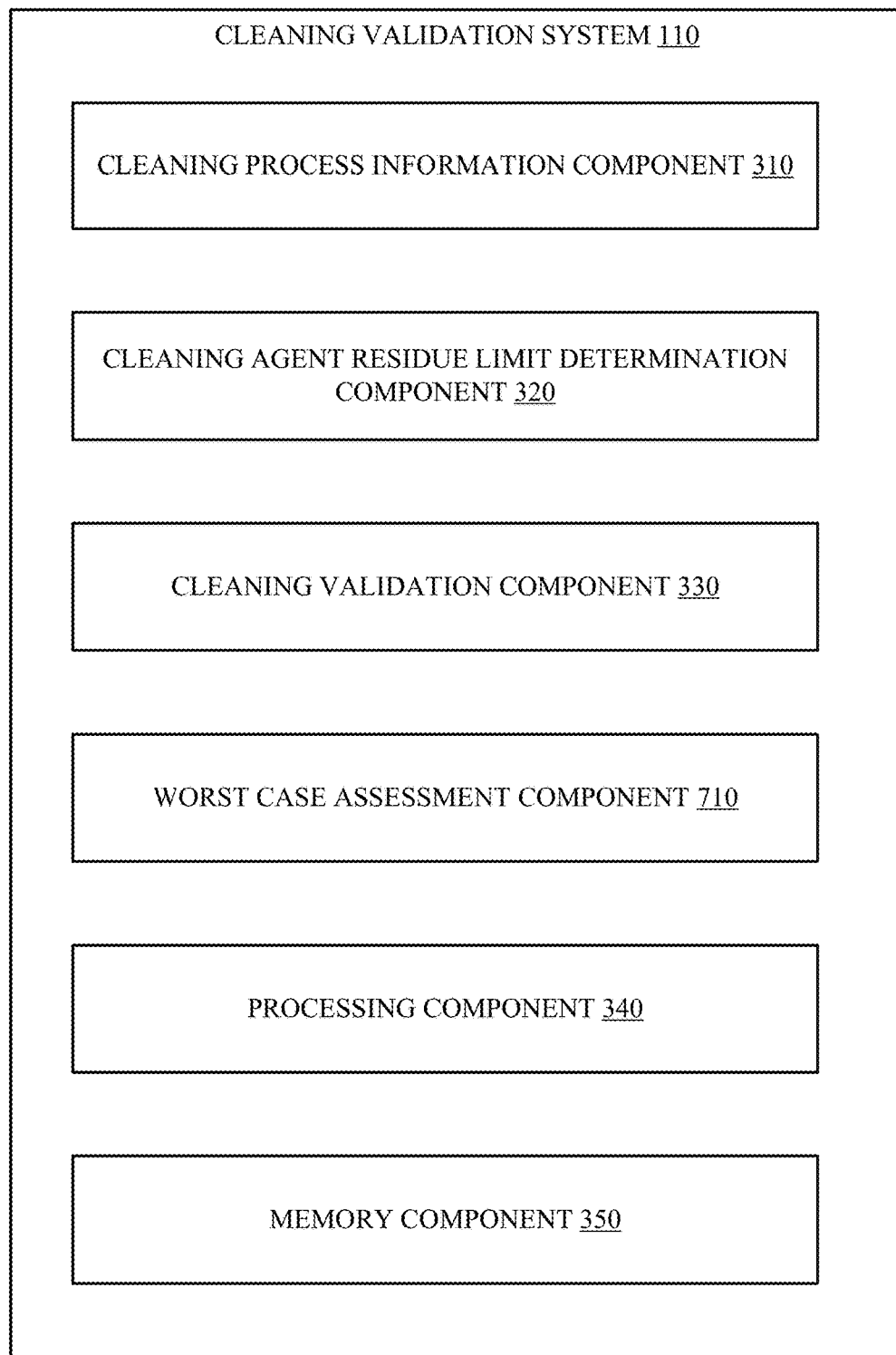
FIGS. 7-8 illustrate block diagrams of a cleaning validation system including a worst case assessment component and the worst case assessment component, respectively, in accordance with various example embodiments.
Figure 8:
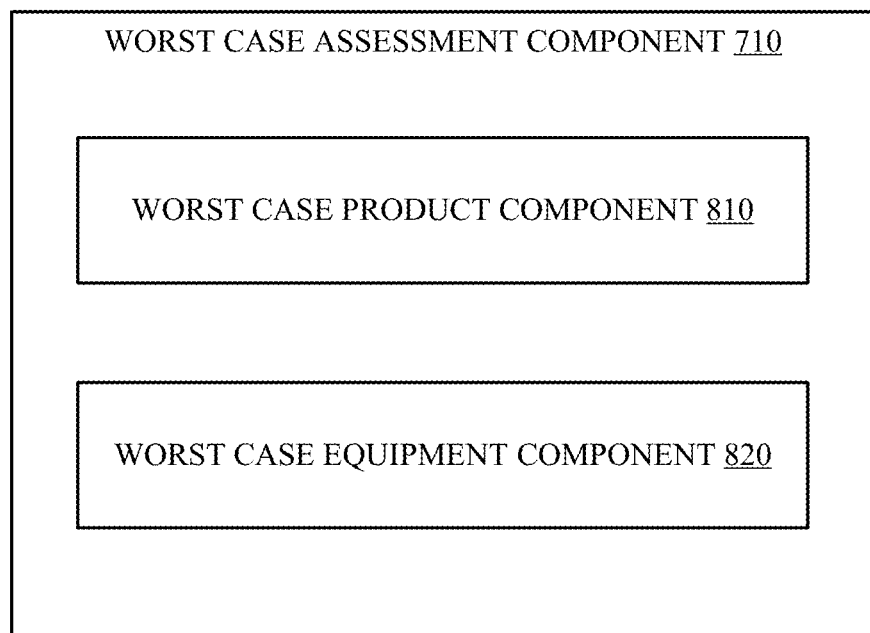

Referring now to FIGS. 7-8, a block diagram (700) of a cleaning validation system including a worst case assessment component (710), and a block diagram (800) of the worst case assessment component are illustrated, respectively, in accordance with various example embodiments. The worst case assessment component comprises a worst case product component (810) and a worst case equipment component (820).

The worst case product component, in response to determining that a new product, different from a group of products including the product, has been added to the group of products, can determine, based on a defined group of conditions representing a solubility of the new product, a toxicity of the new product, adhesive properties of the new product, and/or a potency of the new product with respect to an amount of the new product that has been determined to obtain a desired effect of the new product on a bodily condition of a subject, whether the new product is a worst case product among the group of products representing that the cleaning process is to be modified and the cleaning validation is to be modified to account for the worst case product.

In turn, in response to determining that the new product is the worst case product among the group of products, the worst case assessment component can modify the cleaning process to obtain a modified cleaning process, and initiate, via the cleaning validation component, performance of a cleaning validation of the modified cleaning process according to the cleaning agent residue limit being determined based on the worst case product.

The worst case equipment component, in response to determining that new equipment, different from a group of equipment comprising the equipment, has been added to the group of equipment, can determine, based on a defined group of conditions representing a complexity of a structure of the new equipment, a frequency of use of the new equipment via a defined period of time, a nature of a material of a structure of the new equipment, a capacity of the new equipment with respect the product to be manufactured via the new equipment, and/or a surface area of the new equipment, whether the new equipment is a worst case equipment among the group of equipment representing that the cleaning process is to be modified and the cleaning validation is to be modified to account for the worst case equipment.

In turn, in response to determining that the new equipment is the worst case equipment among the group of equipment, the worst case equipment component can modify the cleaning process to obtain a modified cleaning process, and initiate, via the cleaning validation component, performance of a cleaning validation of the modified cleaning process according to the cleaning agent residue limit being determined based on the worst case equipment.

FIGS. 9-13 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 9:
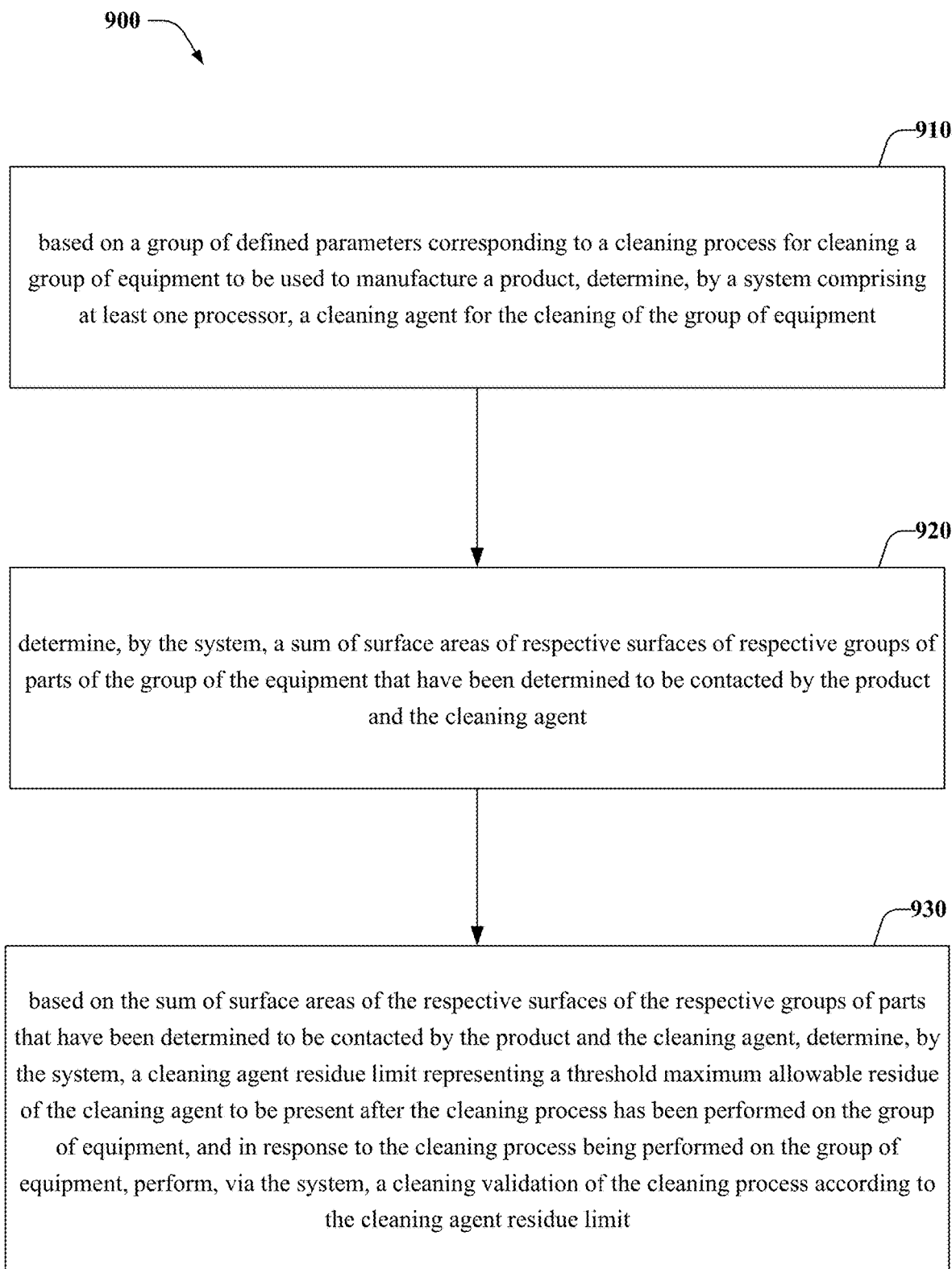
FIG. 9 illustrates a flow chart of a method associated with a cleaning validation system that facilitates a residual limit determination for a cleaning agent corresponding to a validation of an equipment cleaning process, in accordance with various example embodiments.

Referring now to FIG. 9, a process (900) performed by a cleaning validation system (110) that facilitates a residual limit determination for a cleaning agent corresponding to a validation of an equipment cleaning process is illustrated, in accordance with various embodiments. At 910, based on a group of defined parameters corresponding to a cleaning process for cleaning a group of equipment to be used to manufacture a product, the system determines a cleaning agent for the cleaning of the group of equipment.

At 920, the system determines a sum of surface areas of respective surfaces of respective groups of parts of the group of the equipment that have been determined to be contacted by the product and the cleaning agent.

At 930, based on the sum of surface areas of the respective surfaces of the respective groups of parts that have been determined to be contacted by the product and the cleaning agent, the system determines a cleaning agent residue limit representing a threshold maximum allowable residue of the cleaning agent to be present after the cleaning process has been performed on the group of equipment, and in response to the cleaning process being performed on the group of equipment, the system performs a cleaning validation of the cleaning process according to the cleaning agent residue limit.

Figure 10:
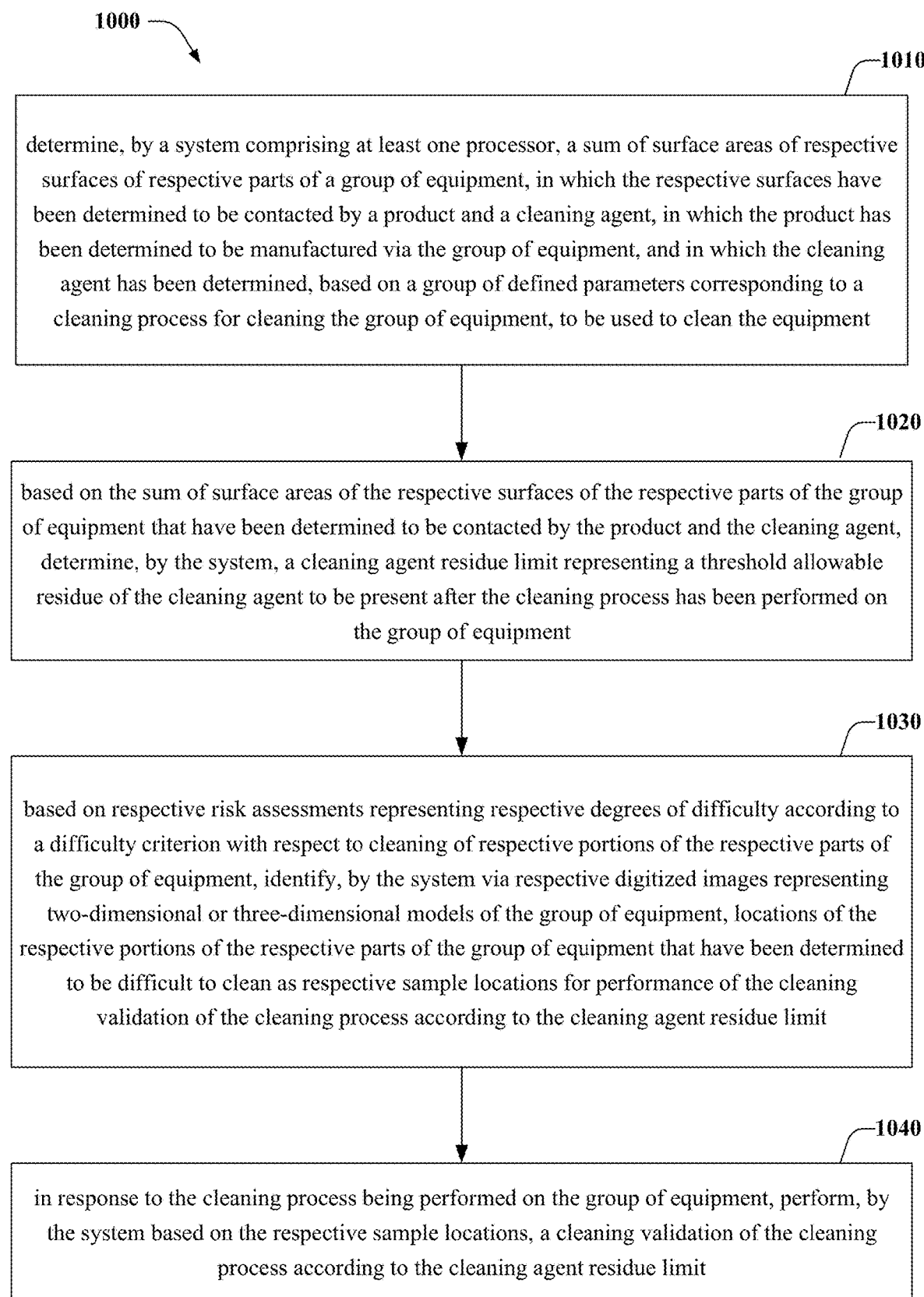
FIG. 10 illustrates a flow chart of another method associated with a cleaning validation system that facilitates a residual limit determination for a cleaning agent corresponding to a validation of an equipment cleaning process and that identifies, via 2-dimensional (D) or 3-D models of a group of equipment, respective sample locations for performance of the validation of the equipment cleaning process, in accordance with various example embodiments.

FIG. 10 illustrates another process (1000) performed by a cleaning validation system (110) that facilitates a residual limit determination for a cleaning agent corresponding to a validation of an equipment cleaning process and that identifies, via 2-D or 3-D models of a group of equipment, respective sample locations for performance of the validation of the equipment cleaning process is illustrated, in accordance with various embodiments. At 1010, the system determines a sum of surface areas of respective surfaces of respective parts of a group of equipment, in which the respective surfaces have been determined to be contacted by a product and a cleaning agent, in which the product has been determined to be manufactured via the group of equipment, and in which the cleaning agent has been determined, based on a group of defined parameters corresponding to a cleaning process for cleaning the group of equipment, to be used to clean the equipment.

At 1020, based on the sum of surface areas of the respective surfaces of the respective parts of the group of equipment that have been determined to be contacted by the product and the cleaning agent, the system determines a cleaning agent residue limit representing a threshold allowable residue of the cleaning agent to be present after the cleaning process has been performed on the group of equipment.

At 1030, based on respective risk assessments representing respective degrees of difficulty according to a difficulty criterion with respect to cleaning of respective portions of the respective parts of the group of equipment the system identifies, via respective digitized images representing two-dimensional or three-dimensional models of the group of equipment, locations of the respective portions of the respective parts of the group of equipment that have been determined to be difficult to clean as respective sample locations for performance of the cleaning validation of the cleaning process according to the cleaning agent residue limit.

At 1040, in response to the cleaning process being performed on the group of equipment, the system performs, based on the respective sample locations, a cleaning validation of the cleaning process according to the cleaning agent residue limit.

FIG. 11 illustrates a process (1100) performed by a cleaning validation system (110) that identifies, as sample locations based on respective risk assessments and utilizing respective digitized images representing 2-D or 3-D models of the equipment, respective portions of respective groups of parts of the equipment that have been determined to be difficult to clean for performance of a cleaning validation, in accordance with various example embodiments.

At 1110, in response to determining respective risk assessments representing respective degrees of difficulty in cleaning of respective portions of the respective groups of parts of the group of equipment, the system determines, based on the respective risk assessments, that the respective portions of the respective groups of parts of the group of equipment are difficult to clean.

At 1120, the system identifies, via respective digitized images representing two-dimensional or three-dimensional models of the group of equipment, locations of the respective portions of the respective groups of parts of the group of equipment that have been determined to be difficult to clean as respective sample locations for performance of the cleaning validation of the cleaning process according to the cleaning agent residue limit.

At 1130, the system associates, via a data store, the respective sample locations with the cleaning validation, in which the performance of the cleaning validation of the cleaning process determines whether an amount of the cleaning agent residue that has been determined to be present on a test sample that has been obtained at a sample location of the respective sample locations is lower than the cleaning agent residue limit.

Figure 12:
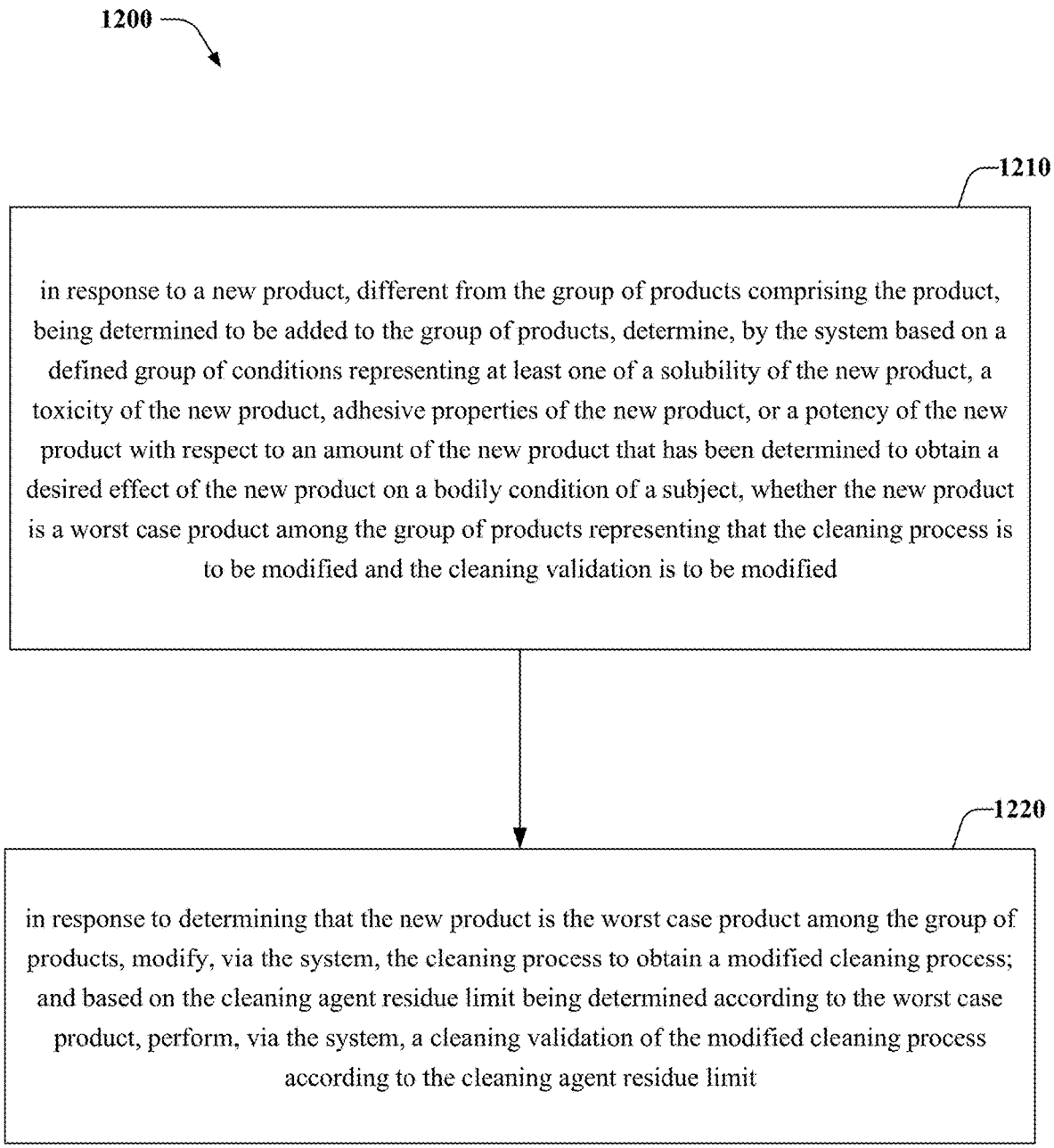
FIG. 12 illustrates a flow chart of a method associated with a cleaning validation system that identifies a worst case product for performance of a cleaning validation, in accordance with various example embodiments.

FIG. 12 illustrates a process (1200) performed by a cleaning validation system (110) that identifies a worst case product for performance of a cleaning validation, in accordance with various example embodiments. At 1210, in response to a new product, different from the group of products comprising the product, being determined to be added to the group of products, the system determines, based on a defined group of conditions representing a solubility of the new product, a toxicity of the new product, adhesive properties of the new product, and/or a potency of the new product with respect to an amount of the new product that has been determined to obtain a desired effect of the new product on a bodily condition of a subject, whether the new product is a worst case product among the group of products representing that the cleaning process is to be modified and the cleaning validation is to be modified.

At 1220, in response to determining that the new product is the worst case product among the group of products, the system modifies the cleaning process to obtain a modified cleaning process; and based on the cleaning agent residue limit being determined according to the worst case product, the system performs a cleaning validation of the modified cleaning process according to the cleaning agent residue limit.

Figure 13:
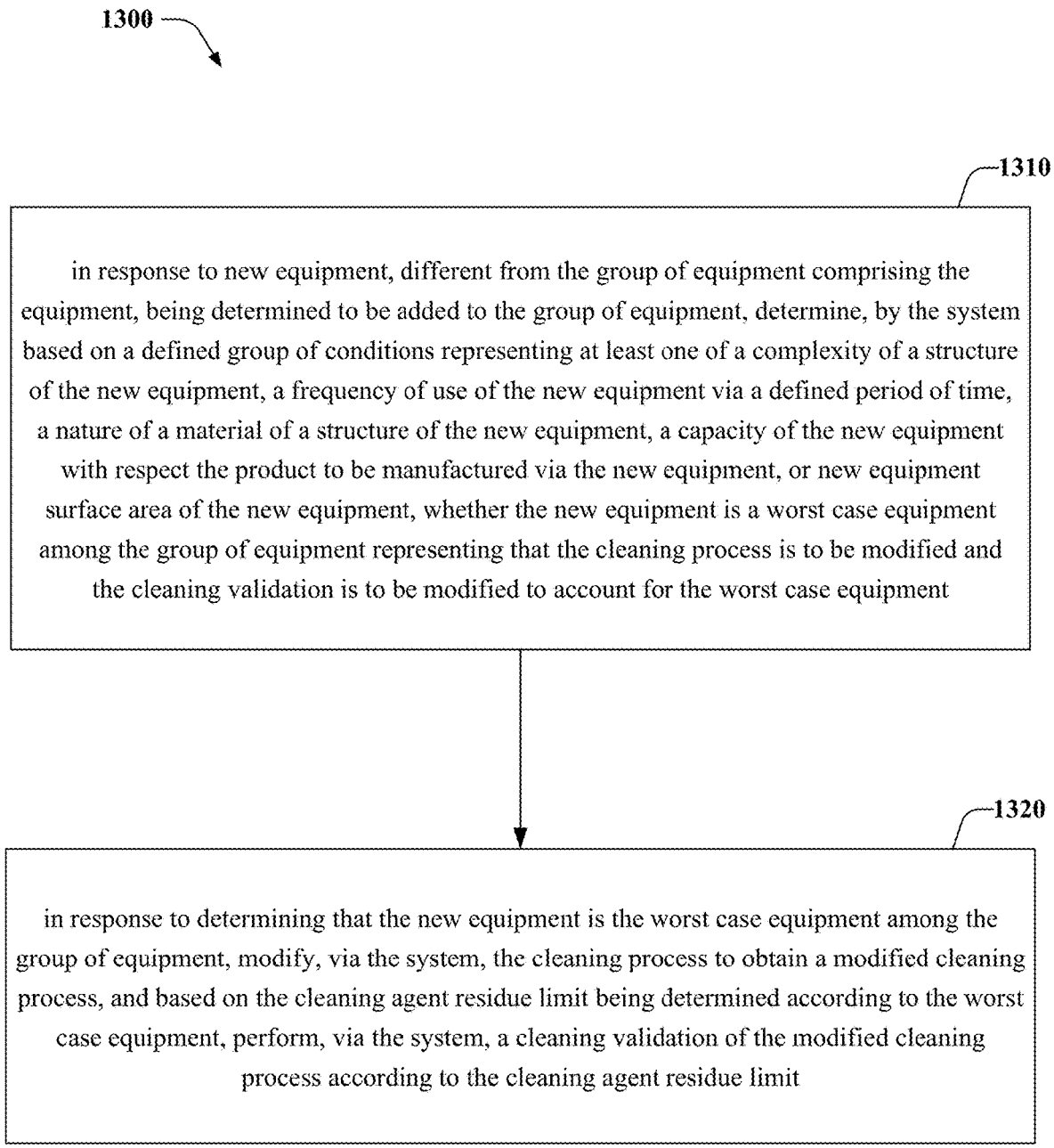
FIG. 13 illustrates a flow chart of a method associated with a cleaning validation system that identifies a worst case equipment for performance of a cleaning validation, in accordance with various example embodiments.

FIG. 13 illustrates a process (1300) performed by a cleaning validation system (110) that identifies a worst case equipment for performance of a cleaning validation, in accordance with various example embodiments. At 1310, in response to new equipment, different from the group of equipment comprising the equipment, being determined to be added to the group of equipment, the system determines, based on a defined group of conditions representing a complexity of a structure of the new equipment, a frequency of use of the new equipment via a defined period of time, a nature of a material of a structure of the new equipment, a capacity of the new equipment with respect the product to be manufactured via the new equipment, and/or new equipment surface area of the new equipment, whether the new equipment is a worst case equipment among the group of equipment representing that the cleaning process is to be modified and the cleaning validation is to be modified to account for the worst case equipment.

At 1320, in response to determining that the new equipment is the worst case equipment among the group of equipment, the system modifies the cleaning process to obtain a modified cleaning process, and based on the cleaning agent residue limit being determined according to the worst case equipment, the system performs a cleaning validation of the modified cleaning process according to the cleaning agent residue limit.

As it is employed in the subject specification, the terms "processor" and "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nanoscale architectures such as, but not limited to, molecular and quantum-dot based transistors, switches and gates, in order to optimize space usage or enhance performance of mobile devices. A processor may also be implemented as a combination of computing processing units.

In the subject specification, terms such as "memory component", "data store", "defined cleaning knowledge base", "data storage device", "storage medium" and substantially any other information storage component relevant to operation and functionality of a component and/or process, refer to memory components, or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in memory component 350, non-volatile memory 1422 (see below), disk storage 1424 (see below), and/or memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory 1220 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 14:
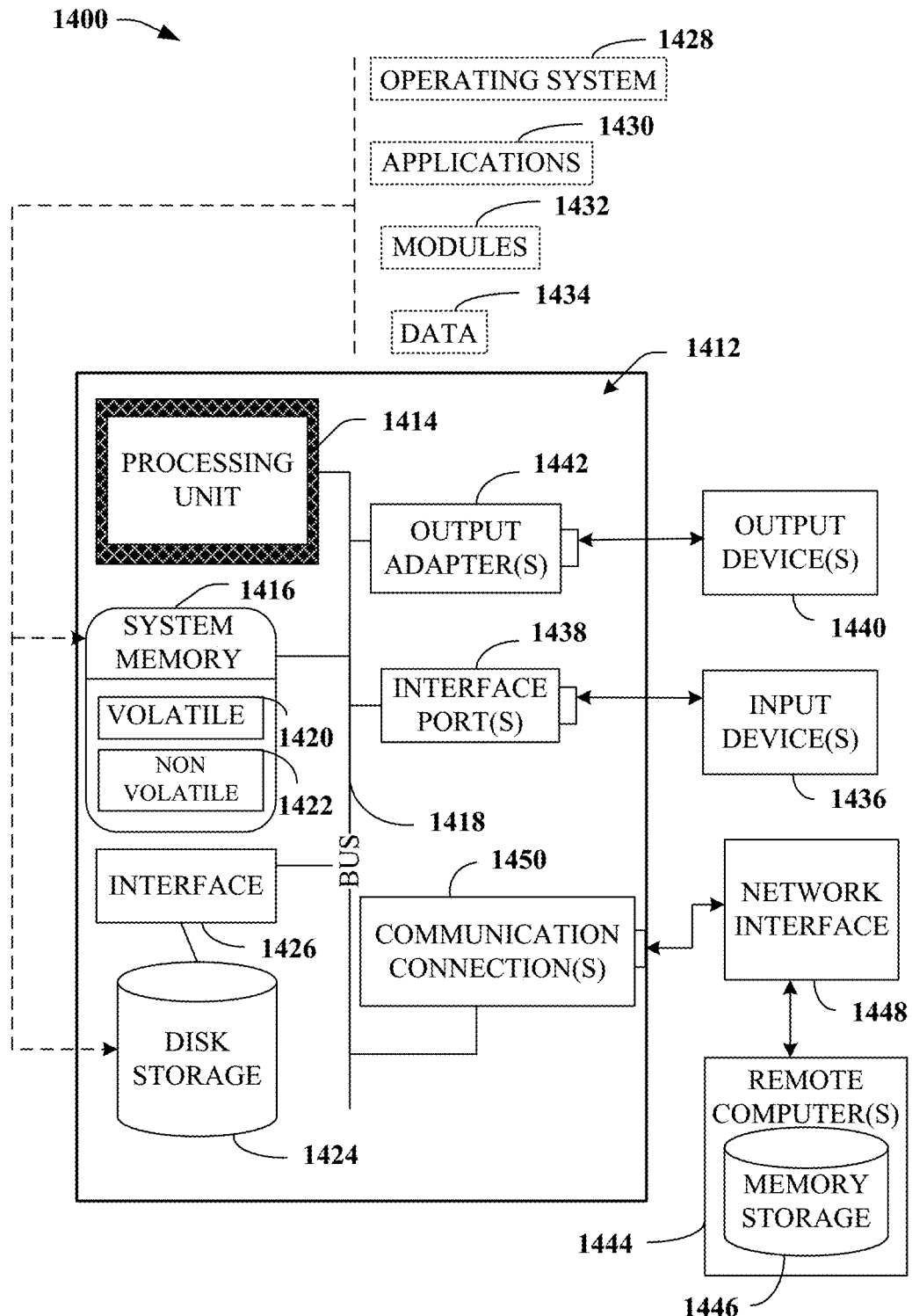
FIG. 14 is a block diagram representing an illustrative non-limiting computing system or operating environment in which one or more aspects of various embodiments described herein can be implemented.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 14, a block diagram of a computing system 1400 operable to execute the disclosed systems and methods is illustrated, in accordance with an embodiment. Computer 1412 comprises a processing unit 1414, a system memory 1416, and a system bus 1418. System bus 1418 couples system components comprising, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1416 comprises volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can comprise ROM, PROM, EPROM, EEPROM, or flash memory. Volatile memory 1420 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also comprises removable/non-removable, volatile/non-volatile computer storage media. FIG. 14 illustrates, for example, disk storage 1424. Disk storage 1424 comprises, but is not limited to, devices like a magnetic disk drive, floppy disk drive, tape drive, Jaz drive, Zip drive, LS-100 drive, flash memory card, or memory stick. In addition, disk storage 1424 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

It is to be appreciated that FIG. 14 describes software that acts as an intermediary between users and computer resources described in suitable operating environment 1400. Such software comprises an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be appreciated that the disclosed subject matter can be implemented with various operating systems or combinations of operating systems.

A user can enter commands or information into computer 1412 through input device(s) 1436. Input devices 1436 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1414 through system bus 1418 via interface port(s) 1438. Interface port(s) 1438 comprise, for example, a serial port, a parallel port, a game port, a universal serial bus (USB), a wireless based port, e.g., Wi-Fi, Bluetooth, etc. Output device(s) 1440 use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440, like display devices, light projection devices, monitors, speakers, and printers, among other output devices 1440, which use special adapters. Output adapters 1442 comprise, by way of illustration and not limitation, video and sound devices, cards, etc. that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, a workstation, a microprocessor based appliance, a peer device, or other common network node and the like, and typically comprises many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically and/or wirelessly connected via communication connection 1450. Network interface 1448 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can comprise, for example, internal and external technologies such as modems, comprising regular telephone grade modems, cable modems and DSL modems, wireless modems, ISDN adapters, and Ethernet cards.

The computer 1412 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1412 can connect to other devices/networks by way of antenna, port, network interface adaptor, wireless access point, modem, and/or the like.

The computer 1412 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word-without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component", "system", "interface" and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per sc.

In accordance with various embodiments, processor(s) for implementing embodiments disclosed herein can comprise distributed processing devices, or parallel processing devices, in a single machine, device, etc., or across multiple machines, devices, etc. Furthermore, the processor(s) can comprise a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

In accordance with various aspects of the subject specification, artificial intelligence based systems, components, etc. (e.g., components of cleaning validation system 110) can employ classifier(s) that are explicitly trained, e.g., via a generic training data, as well as implicitly trained, e.g., by receiving historical information, by receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by components of cleaning validation system 110, comprising, but not limited to: based on a group of defined parameters corresponding to a cleaning process for cleaning a group of equipment to be used to manufacture a product, determining a cleaning agent for the cleaning of the group of equipment; determining a sum of surface areas of respective surfaces of respective groups of parts of the group of the equipment that have been determined to be contacted by the product and the cleaning agent; and based on the sum of surface areas of the respective surfaces of the respective groups of parts that have been determined to be contacted by the product and the cleaning agent, determining a cleaning agent residue limit representing a threshold maximum allowable residue of the cleaning agent to be present after the cleaning process has been performed on the group of equipment.

A classifier can be a function that maps an input attribute vector, x=(x1, x2, x3, x4, xn), to a confidence that the input belongs to a class, that is, f (x)=confidence (class). Such classification can employ a probabilistic and/or statistical-based analysis (e.g., factoring into the analysis utilities and costs) to infer an action that a user desires to be automatically performed. In the case of a cleaning validation system disclosed herein, for example, attributes can be information corresponding to operations performed via the cleaning validation system that has been stored via a defined cleaning knowledge base, and the classes can be categories or areas of interest, e.g., corresponding to defined conditions and/or thresholds utilized via the cleaning validation system. A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

As used herein, the term "infer" or "inference" refers generally to the process of reasoning about, or inferring states of, the system, environment, user, and/or intent from a set of observations as captured via events and/or data. Captured data and events can comprise user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   at least one processor; and
   at least one memory that stores executable components that, when executed by the at least one processor, facilitate performance of operations by the system, the operations comprising:
   determining a product to be manufactured via an equipment, a group of defined parts of the equipment, respective defined cleaning modes of the group of defined parts, and respective surface areas of respective surfaces of the group of defined parts;
   based on the product to be manufactured via the equipment, a type of a surface of the respective surfaces of a defined part of the group of defined parts, a surface area of the surface of the defined part, and a cleaning mode of the respective defined cleaning modes of the defined part, determining a cleaning agent to be used for cleaning, via a cleaning process, the surface of the defined part;
   in response to the surface area of the surface of the defined part being determined to be contacted by the product and the cleaning agent, identifying the surface area as a shared surface area for the defined part;
   determining a sum of shared surface areas of the respective surface areas of the defined parts that have been determined to be contacted by the product and the cleaning agent, wherein the shared surface areas comprises the shared surface area for the defined part; and
   based on the sum of shared surface areas of the defined parts that have been determined to be contacted by the product and the cleaning agent,
   determining a cleaning agent residue limit representing a threshold allowable residue of the cleaning agent to be present after the cleaning process has been performed on the equipment, and
   in response to the cleaning process being performed on the equipment,
   performing a cleaning validation of the cleaning process according to the cleaning agent residue limit, wherein the performing of the cleaning validation comprises based on respective risk assessments representing respective degrees of difficulty in cleaning of respective portions of the defined parts of the equipment, identifying, via respective digitized images representing two-dimensional or three-dimensional models of the equipment, locations of the respective portions of the defined parts of the equipment that have been determined to be difficult to clean as respective sample locations for performance of the cleaning validation of the cleaning process according to the cleaning agent residue limit.

2. The system of claim 1, wherein the respective surfaces are first respective surfaces, wherein the respective surface areas are first respective surface areas, wherein the sum is an equipment sum, wherein the cleaning agent residue limit is an equipment cleaning agent residue limit, wherein the threshold allowable residue of the cleaning agent is an equipment threshold allowable residue of the cleaning agent, wherein the cleaning validation is an equipment cleaning validation, and wherein the operations further comprises:

determining a group of equipment comprising the equipment to be used to manufacture the product, wherein the group of equipment comprises an equipment train;

determining an equipment train sum of second respective surface areas of second respective surfaces of the equipment train that are to be contacted by the product and the cleaning agent; and based on the equipment train sum,
  determining an equipment train cleaning agent residue limit representing an equipment train threshold allowable residue of the cleaning agent to be present after the cleaning process has been performed on the equipment train, and
  performing an equipment train cleaning validation of the cleaning process according to the equipment train cleaning agent residue limit.

3. The system of claim 1, wherein the operations further comprise:
  based on a defined cleaning knowledge base that has been stored in a data store and that represents types of surfaces of the equipment that have been determined to satisfy a defined condition representing that the equipment is difficult to clean, determining the respective portions of the defined parts of the equipment that have been determined to be difficult to clean.

4. The system of claim 3, wherein the determining of the respective portions of the defined parts of the equipment that have been determined to be difficult to clean further comprises:
  determining the respective risk assessments representing the respective degrees of difficulty in cleaning of the respective portions of the defined parts of the equipment; and
  based on the respective risk assessments, determining that the respective portions of the defined parts of the equipment are difficult to clean.

5. The system of claim 1, wherein the operations further comprise:
  associating, via a data store, the respective sample locations with a cleaning validation process that validates, via the performance of the cleaning validation, whether an amount of the cleaning agent residue that has been determined to be present on a test sample that has been obtained at a sample location of the respective sample locations is lower than the cleaning agent residue limit.

6. The system of claim 5, wherein the operations further comprise:
  based on a defined sampling protocol, determining respective types of samples to perform at the respective sample locations for the performance of the cleaning validation of the cleaning process according to the cleaning agent residue limit.

7. The system of claim 6, wherein the defined condition is a first defined condition, and wherein the operations further comprise:
  obtaining, via instruments, the respective types of samples at the respective sample locations according to the defined sampling protocol; and
  determining whether the respective types of samples satisfy a second defined condition representing that the amount of the cleaning agent residue that has been determined to be present on the respective types of samples is lower than the cleaning agent residue limit.

8. The system of claim 1, wherein the sum of shared surface areas of the defined parts of the equipment is less that a total surface area of the equipment.

9. The system of claim 1, wherein a group of products that has been determined to be manufactured via a group of equipment comprising the equipment comprises the product, and wherein the operations further comprise:
  in response to a new product, different from the group of products, being determined to be added to the group of products, determining, based on a defined group of conditions representing at least one of a solubility of the new product, a toxicity of the new product, adhesive properties of the new product, or a potency of the new product with respect to an amount of the new product that has been determined to obtain a desired effect of the new product on a bodily condition of a subject, whether the new product is a worst case product among the group of products representing that the cleaning process is to be modified and the cleaning validation is to be modified.

10. The system of claim 9, wherein the cleaning validation is a first cleaning validation, and wherein the operations further comprise:
  in response to determining that the new product is the worst case product among the group of products,
    modifying the cleaning process to obtain a modified cleaning process; and
    performing a second cleaning validation of the modified cleaning process according to the cleaning agent residue limit being determined based on the worst case product.

11. The system of claim 1, wherein a group of products that has been determined to be manufactured via a group of equipment comprising the equipment comprises the product, wherein the surface area of the equipment is a first surface area, and wherein the operations further comprise:
  in response to new equipment, different from the group of equipment, being determined to be added to the group of equipment, determining, based on a defined group of conditions representing at least one of a complexity of a structure of the new equipment, a frequency of use of the new equipment via a defined period of time, a nature of a material of a structure of the new equipment, a capacity of the new equipment with respect the product to be manufactured via the new equipment, or a second surface area of the new equipment, whether the new equipment is a worst case equipment among the group of equipment representing that the cleaning process is to be modified and the cleaning validation is to be modified to account for the worst case equipment.

12. The system of claim 11, wherein the cleaning validation is a first cleaning validation, and wherein the operations further comprise:
  in response to determining that the new equipment is the worst case equipment among the group of equipment,
    modifying the cleaning process to obtain a modified cleaning process; and
    performing a second cleaning validation of the modified cleaning process according to the cleaning agent residue limit being determined based on the worst case equipment.

13. A method, comprising:
  based on a group of defined parameters corresponding to a cleaning process for cleaning a group of equipment to be used to manufacture a product, determining, by a system comprising at least one processor, a cleaning agent for the cleaning of the group of equipment;
  determining, by the system, a sum of surface areas of respective surfaces of respective groups of parts of the group of the equipment that have been determined to be contacted by the product and the cleaning agent; and based on the sum of surface areas of the respective surfaces of the respective groups of parts that have been determined to be contacted by the product and the cleaning agent, determining, by the system, a cleaning agent residue limit representing a threshold maximum allowable residue of the cleaning agent to be present after the cleaning process has been performed on the group of equipment, and in response to the cleaning process being performed on the group of equipment, performing, via the system, a cleaning validation of the cleaning process according to the cleaning agent residue limit, wherein the performing of the cleaning validation comprises in response to determining respective risk assessments representing respective degrees of difficulty in cleaning of respective portions of the respective groups of parts of the group of equipment, determining, by the system based on the respective risk assessments, that the respective portions of the respective groups of parts of the group of equipment are difficult to clean, and identifying, by the system via respective digitized images representing two-dimensional or three-dimensional models of the group of equipment, locations of the respective portions of the respective groups of parts of the group of equipment that have been determined to be difficult to clean as respective sample locations for performance of the cleaning validation of the cleaning process according to the cleaning agent residue limit.

14. The method of claim 13, further comprising:
associating, by the system via a data store, the respective sample locations with the cleaning validation, wherein the performance of the cleaning validation of the cleaning process determines whether an amount of the cleaning agent residue that has been determined to be present on a test sample that has been obtained at a sample location of the respective sample locations is lower than the cleaning agent residue limit.

15. The method of claim 13, wherein a group of products that have been determined to be manufactured via the group of equipment comprises the product, wherein the cleaning validation is a first cleaning validation, and wherein the method further comprises:

in response to a new product, different from the group of products, being determined to be added to the group of products, determining, by the system based on a defined group of conditions representing at least one of a solubility of the new product, a toxicity of the new product, adhesive properties of the new product, or a potency of the new product with respect to an amount of the new product that has been determined to obtain a desired effect of the new product on a bodily condition of a subject, whether the new product is a worst case product among the group of products representing that the cleaning process is to be modified and the first cleaning validation is to be modified; and in response to determining that the new product is the worst case product among the group of products, modifying, via the system, the cleaning process to obtain a modified cleaning process; and based on the cleaning agent residue limit being determined according to the worst case product, performing, via the system, a second cleaning validation of the modified cleaning process according to the cleaning agent residue limit.

16. The method of claim 13, wherein the cleaning validation is a first cleaning validation, and wherein the method further comprises:

in response to new equipment, different from the group of equipment, being determined to be added to the group of equipment, determining, by the system based on a defined group of conditions representing at least one of a complexity of a structure of the new equipment, a frequency of use of the new equipment via a defined period of time, a nature of a material of a structure of the new equipment, a capacity of the new equipment with respect the product to be manufactured via the new equipment, or a second surface area of the new equipment, whether the new equipment is a worst case equipment among the group of equipment representing that the cleaning process is to be modified and the first cleaning validation is to be modified to account for the worst case equipment; and in response to determining that the new equipment is the worst case equipment among the group of equipment, modifying, via the system, the cleaning process to obtain a modified cleaning process, and based on the cleaning agent residue limit being determined according to the worst case equipment, performing, via the system, a second cleaning validation of the modified cleaning process according to the cleaning agent residue limit.

17. A non-transitory machine-readable medium, comprising executable instructions that, when executed by a processor, facilitate performance of operations, comprising:

determining a sum of surface areas of respective surfaces of respective parts of a group of equipment, wherein the respective surfaces have been determined to be contacted by a product and a cleaning agent, wherein the product has been determined to be manufactured via the group of equipment, and wherein the cleaning agent has been determined, based on a group of defined parameters corresponding to a cleaning process for cleaning the group of equipment, to be used to clean the equipment; and based on the sum of surface areas of the respective surfaces of the respective parts of the group of equipment that have been determined to be contacted by the product and the cleaning agent, determining a cleaning agent residue limit representing a threshold allowable residue of the cleaning agent to be present after the cleaning process has been performed on the group of equipment, and in response to the cleaning process being performed on the group of equipment, performing a cleaning validation of the cleaning process according to the cleaning agent residue limit, wherein the performing of the cleaning validation further comprises based on respective risk assessments representing respective degrees of difficulty according to a difficulty criterion with respect to cleaning of respective portions of the respective parts of the group of equipment, identifying, via respective digitized images representing two-dimensional or three-dimensional models of the group of equipment, locations of the respective portions of the respective parts of the group of equipment that have been determined to be difficult to clean as respective sample locations for performance of the cleaning validation of the cleaning process according to the cleaning agent residue limit.

* * * * *